July 16, 1968  S. B. HAINSWORTH ET AL  3,393,115
CONVEYOR BELTING
Filed Nov. 29, 1963
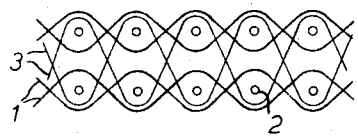
-FIG. 1.-
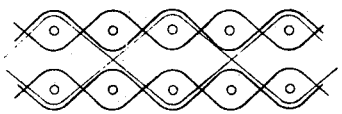
-FIG. 2.-
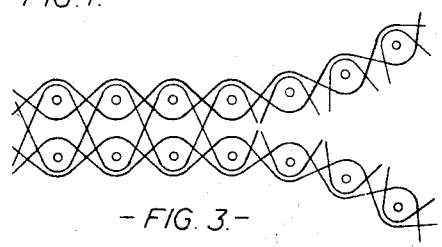
- FIG. 3.-
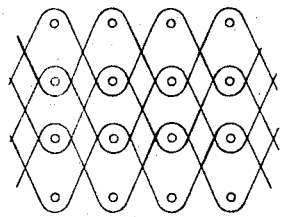
-FIG. 5.-
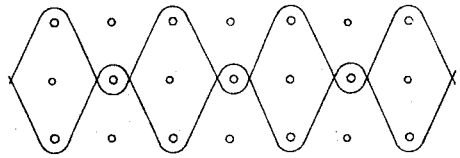
- FIG. 4.-
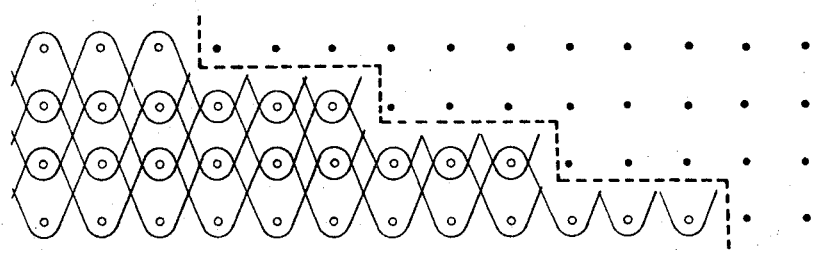
- FIG. 6.-
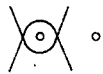
-FIG. 7.-
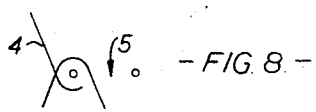
- FIG. 8.-
INVENTORS:
SIDNEY B. HAINSWORTH
GILBERT E. WATTS
BY
ATTORNEYS

United States Patent Office 3,393,115
Patented July 16, 1968

3,393,115
CONVEYOR BELTING
Sidney Beetham Hainsworth, Elloughton, near Brough, and Gilbert Ernest Watts, Garden Village, Hull, England, assignors to J. H. Fenner & Co. Limited, Marfleet, Hull, England, a British company
Filed Nov. 29, 1963, Ser. No. 326,751
Claims priority, application Great Britain, Nov. 30, 1962, 45,306/62
11 Claims. (Cl. 161—36)

This invention relates to improvements in conveyor or driving belts and, more particularly, to means for joining the ends of conveyor belts of the type which embody a solid woven core. By the expression "solid woven" is meant a multiple ply textile fabric in which the various plies are held together by binding threads, with the whole fabric produced in one weaving operation, i.e. it is not a series of plies woven separately and then stitched or otherwise joined together subsequent to weaving. The term "solid woven" in this sense refers to the completion of the fabric and does not hold reference to ply density.

There are two basic methods of joining the ends of conveyor beltings. One method is to connect the ends together with various metallic fasteners and the other is to adopt a splicing technique.

Hitherto, an objection raised to the extended use of solid woven beltings has been that they cannot be successfully spliced and hence their use is limited to horsepower drives where metallic fasteners are suitable. This has been no particular barrier to their use hitherto but an era is now approaching when very much higher horse power drives will be used and for such drives the metallic fasteners developed to date will not be adequate.

There are advantages to a spliced joint, not the least of which are long life in service and greater joint strength. If a spliced joint is well made it could well last the life of the belt, which could be measured in years, whereas with a metallic fastener joint it is customary after a period of time, usually not exceeding one year, to replace these joints in view of the wear which takes place in service. It has further been found in practice that a spliced joint will carry a somewhat higher loading than a metallic joint and most belting manufacturers quote on such a basis.

One basic difficulty associated with the design of beltings for splicing is that, inevitably, high tensile yarns must be used to produce the stronger belts. Such yarns are of a filamentary nature and possess poor adhesion to the elastomer used to impregnate the belt. It is known, for example, to produce laminated ply beltings which are woven from individual plies having high tenacity filament rayon warp yarns. These do give high tensile strength but necessitate a treatment of the yarn to secure adhesion to the elastomer. This adds to the expense and further limits the choice of suitable elastomers which can be used.

Another approach to the problem has been to mix a number of staple fibre yarns, such as cotton, with the filament yarns and so present a surface having an increased affinity for the elastomer. Even this artifice does not give particularly good results, for two major reasons. Firstly, it is obvious that where staple and filament yarns are twisted together, the staple fiber component is present over only a minor portion of the yarn surface, unless it is used in a large amount, which adds to the belt bulk and cost. Secondly, ply belting fabrics are relatively tightly woven and there is no marked protrusion of the elastomer through the fabric which would physically assist the splicing. It should be understood that even in belts which are to be spliced together it is advantageous to have a reasonable measure of mechanical fastener holding so that the belt may be put into service initially using mechanical fasteners and any unwanted initial stretch removed during the first short period of running. This stretch would be accommodated by the normal loop take-up of the conveyor arrangement but would then be cut out and the belt given its correctly spliced joint for permanent use.

An object of the present invention is to provide a method of making an improved joint in a conveyor belt of the type which embodies a solid woven core.

A further object of the invention is to provide an improved method of making conveyor belting which is capable of being jointed both readily and satisfactorily.

A further object of the present invention is to provide a method of joining the ends of a conveyor belt of the type embodying a solid woven core by which a joint is achievd the adhesive strength of which is equal to or exceeds the strength of the belt at the joint.

According to the present invention a method of providing an improved joint in a conveyor belt of the type embodying a solid woven core comprises weaving the core so loosely as to be unsuitable for belting duties per se, imparting stability and the like conventional belting characteristics to the said core by impregnating it with an elastomeric material, cutting or tearing back between one or more complementary plies in the intended mating ends of the belting to expose the severed ends of the binder threads and to provide a lap joint, treating the mating ends of the lap joint with an elastomeric material and thereafter fusing the ends together.

According to another aspect of the invention a method of joining the ends of conveyor belting of the type which consists of an elastomeric-impregnated solid woven core comprises forming a differential and complementary rebate at each of the intended mating ends of the belting by cutting away progressive amounts of adjacent plies and exposing the cut or broken ends of the binder threads serving to hold the plies together, coating the exposed portions of the plies with elastomeric material and thereafter mating and fusing together the coated ends of the belt to provide a spliced joint.

In one embodiment of the invention the two or more plies of the solid woven core are represented by a plain weave.

In one preferred form of the invention high tenacity filamentary yarns are provided in the warp.

In one convenient form of the invention binder threads of staple fibre yarns are utilised. To achieve stronger binder threads while yet retaining the staple nature conducive to good binding, a minor proportion of high tensile filament yarn may be added.

In one form of the invention it has been found convenient to subject the binder threads to slight tension during the cutting stage. Alternatively, the binder threads may be broken by tearing the plies apart.

In one preferred form of the invention polyvinylchloride (P.V.C.) in the form of an elastomeric paste is employed as both the impregnant for the solid woven core and as the coating for the exposed portions of the plies constituting the lap joint. In another form of the invention, a thin sheet of gelled P.V.C. may be used to bond the plies together at the joint, under the influence of heat and pressure. This has the advantage of ease of operation.

Thus, according to the present invention, it will be found convenient to weave a belting loosely in accordance with our post weave impregnation process described and claimed in our British Patent No. 770,524. This process allows penetration of the elastomer, in this particular instance P.V.C. paste, through the plies so as to secure physical holding. The individual plies are arranged in either a plain or other (e.g. twill or sateen) weave, and are woven together with binder yarns in the solid woven process. It is normally advantageous to have the individual plies in plain weave as this gives the maximum grip on the weft yarns and hence the maximum metallic fastener holding for the initial period when metallic fasteners are in use. It will also be appreciated that if a spliced belt becomes severely damaged in service it may be necessary to cut out the damaged portion and effect a temporary joining with metallic fasteners until it is convenient to insert a further spliced joint.

It will normally be found convenient to use warp yarns of high tenacity filamentary yarns so as to achieve the maximum belt strength, although it is to be understood that for weaker beltings there is no objection to using weaker yarns, such as staple fibre yarns. To achieve a desirable balance between belt and joint strength, it may be desirable to mix filamentary with staple yarns for the warp.

The binder yarns weave vertically between the plies and are arranged simply to bind one ply to its adjacent neighbour. Thus, for a belt having $n$ plies there will be $n-1$ separate sets of binder threads. Binder threads of staple fibre yarn are normally used with advantage as they contribute substantially to the satisfactory degree of adhesion which can be achieved in solid woven belting.

It will be understood that the binder yarns have to be severed between the individual plies so as to cut or tear back one or more plies of the belting in order to prepare it for a spliced joint. This is the reason why each ply is bound merely to its neighbouring ply, so that on severing between the plies there is no disturbance of the binding together of the remaining plies. It will normally be found convenient to apply a slight tension to the belting as the plies are separated because this has the effect of straining the binder threads. These may be readily split with a sharp knife as the plies are drawn apart and it is quite practical to perform this operation without any damage whatever to the plies themselves. A moderate tension on pulling the plies apart tends slightly to stretch the binder threads so that when these are cut they protrude slightly from the face of the cut ply. These slightly protruding ends contribute most effectively to the subsequent adhesion of the spliced joint. Alternatively sufficient tension may be applied to break the binder yarns without the need for cutting. If this greater degree of tension is applied in separating the plies it is possible for the binder threads to be pulled out occasionally from over the loop of weft and so protrude considerably, leaving a hole in the ply from whence they had been drawn. Both of these factors considerably help the subsequent adhesion. On the one hand a reasonably long length of staple fibre yarn is left securely locked into one ply but protruding into the interface so as to materially contribute to the adhesion. On the other hand a hole through a ply is provided which can subsequently be filled with the elastomer and so once more aid the adhesion. It has been found that protruding binder yarns up to ½" in length are not detrimental and indeed are effective in increasing the adhesion.

The plies are cut back in this fashion, preferably progressively according to the number of plies involved, and then, preferably, a thin film of elastomer paste is applied to the intended mating surfaces of the lap joint; or a thin sheet of gelled elastomer paste is interposed and the surfaces are brought together with the joint heated in a press until the elastomer reaches its appropriate temperature to achieve adhesion.

Whilst the invention is particularly applicable to the P.V.C. impregnated type of belting, it can also be extended to solid woven belting impregnated with natural or synthetic rubber. In this latter event the vulcanisation process would be slightly different inasmuch as a liquid film of the elastomer, disposed in a suitable solvent, would be applied to the exposed surface of the joint. The solvent would be largely evaporated from the film and the mating ends of the belt brought together in a tacky condition and subsequently vulcanised. With P.V.C., a thin film of P.V.C. paste, or gelled P.V.C. sheet, is applied and the belting merely requires to reach the gelling temperature of this material to effect an excellent degree of adhesion.

The present invention is particularly efficacious in that the binder yarns, which contribute so effectively to the adhesion in the manner described, are spaced regularly and evenly throughout the belt so that adhesion then becomes a planned and uniform process, not depending on any haphazard chance effects. By adjusting the number of binder yarns and the individual yarn constitutents of each, and also the type of binder yarn employed, the degree of adhesion can be controlled. A large number of uniformly spaced, protruding cut ends of staple yarn are well suited to securing a sound adhesion in the joint.

With laminated ply type beltings, joint strengths are normally about 50 or 60% of the belt strength and 70% would be classed as quite good. Joint strengths even below this range of values are not uncommon. In a solid woven belt made in accordance with the present invention and in which each of four plain weave plies had a tensile somewhat in excess of 1000 lbs. per inch width, it was found that joint strengths in excess of the ply strengths were readily obtainable so that in actual test performed upon the joints, it was the belting which broke in the jointed region, and not any loss of adhesion which allowed the constituent plies to pull apart. This result was proved with joints down to 6" overlap and up to 12", showing that the adhesion was of a very high order.

The present invention is applicable to a belting of any number of plies, providing that the plies are arranged with binder yarns appropriately.

The invention will now be more particularly described by reference to the drawings which illustrate different solid woven cores suitable for impregnation and splicing in accordance with the invention.

FIG. 1 represents a weft section of a two-ply solid woven core, each plain weave ply of warp threads 1 and weft threads 2 being held together by binder threads 3. This design can be extended to any greater number of plies, e.g., the 4 ply version in FIG. 6.

FIG. 2 represents a modification of FIG. 1 wherein the binder threads follow a different path. This may likewise be extended to any greater number of plies.

FIG. 3 represents a cut section of a belt embodying the solid woven core of FIG. 1 wherein the binder threads 3 have been cut, leaving the warp and weft threads intact.

FIG. 4 represents a weft section of a three-ply solid woven core in which the plain weave warp threads have been omitted for clarity. It will be observed that only half the number of binder threads are involved as compared with FIG. 1.

FIG. 5 represents a weft section of a four-ply solid woven core in which four plain weave plies are held together by binder threads woven as in FIG. 1. Again, for the sake of clarity the warp threads have been omitted.

FIG. 6 represents a stepped joint in a belt embodying a four-ply solid woven core. At the left hand end of the joint, the warp threads have been omitted for clarity. At the right hand end both warp and binder threads have been omitted from the mating end of the belt.

In actual beltings there would be steps of probably 6" to 12" per ply and at, say, five picks per inch this would be 30 to 60 weft picks per step, not merely 3 as illustrated.

FIGS. 7 and 8 illustrate the result of cutting the binder threads whilst the belt is subjected to tension. The binder threads are thus subjected to a slight stretching and it is even possible for them to be pulled out from over the loop of weft and so protrude considerably as at 4, leaving a corresponding hole as at 5.

By way of example, a method of making a belt joint according to the invention will now be described in some detail.

The end of the length of belting is laid upon a suitable firm flat surface and with a knife the binder threads are severed between the first and second woven plies, cutting into the belt for a distance of about ½" or more. This splitting of the belt at the end enables the ply which has so been cut free to be gripped by a pair of pincers when it may then be torn back or it may be strained away from the rest of the belt and the strained binders may be readily cut with the sharp point of a knife. Tearing back or cutting back is optional and has no marked effect on the subsequent bond. Tearing back tends to produce longer lengths of binder yarns protruding from the plies due to these being torn out of the belting and in those parts where the yarns are pulled free, there remains a hole or pocket into which P.V.C. paste may subsequently be applied and further assist in securing high bond strength. In the case of plies which are cut back, the binder yarns give shorter protrusions which are uniformly and evenly spaced and the free cut ends of these bed securely into the paste subsequently used in the joint.

An advantage of tearing back is that this is a quicker procedure than cutting and further there is not the danger of inadvertently damaging the belting plies by the unskillful use of the knife. With reasonable care however it is quite feasible and practical to make a joint by severing the binders as described.

After the first ply has been cut back for the required distance, it is then cut away from the belt body at the required length and a similar operation is carried out in severing the binders between the second and third plies. The second ply is cut back to the appropriate length and the operation repeated between any further plies according to the number in the belting construction. The belt end, when finally prepared for splicing will have a stepped formation, according to the number of plies involved and protruding from each of the cut surfaces will be the severed binder threads. The mating belt end will be such as will match exactly to the end so prepared and the two surfaces to be joined are then treated with a thin layer of P.V.C. paste, similar to that used in the general belting composition. The belt joint is then placed in a vulcanising press and heated to a temperature such as to fuse the P.V.C. paste and so securely unite the two ends. Such a temperature is in the region of 160° to 180° C., dependent upon the particular P.V.C. mix employed. It is necessary to allow the joint to cool to about 100° C. before removing from the press to avoid separation arising from the thermoplastic nature of the P.V.C. material.

Tests on joints made in this manner have shown the bond strength to be so great that the belting does not pull apart at the joint but breaks in the body of the belt in line with one of the ply ends. The breaking strength over the joint region is therefore the breaking strength of the whole belt less the proportion due to one ply being severed. Thus in the case of a three ply belting the joint would withstand two thirds of the whole belt tensile and in the case of a four ply belting it would withstand three quarters of this.

We claim:

1. In a conveyer belt or the like having solid woven core including a number of plies and binder threads binding the plies with each ply being bound only to its neighboring ply by the binder threads, a spliced joint including two end sections of the belt, the end sections having complementary shapes interengaged and bonded together to form a continuous belt section at the joint, each belt section having binder threads extending beyond the ends of the respective sections a distance not exceeding approximately one-half inch, the binder threads extending beyond the belt end sections being bonded together to enhance the strength of the joint.

2. The joint defined in claim 1 wherein said binder threads protrude from their respective belt end sections approximately one-half inch.

3. The joint defined in claim 1 wherein an adhesive is applied between the belt end sections to bond them together, the belt end sections have a number of pockets resulting from tensioning and consequent displacement of a number of binder threads, and wherein said adhesive is introduced into said pockets to further enhance the strength of the spliced joint.

4. A method of providing an improved joint in a conveyor belt which embodies an impregnated multiple ply textile fabric core of the solid woven type wherein the plies are held together by binder threads with each ply being bounded only to its neighboring plies, which comprises separating adjacent plies at each of the belt ends to be joined by severing the binder threads, removing portions of the separated plies to expose the severed ends of the binder threads and to provide complementary mutually engageable surfaces at the belt ends, maintaining the severed binder threads in the separator plies except for those binder threads accidentally removed from the plies during separation of the plies and severing of the binder threads, applying an elastomeric material to the severed ends of the binder threads and to the complementary surfaces, engaging the complementary surfaces of the belt ends and fusing said belt ends together along with their respective binder threads to provide said joint.

5. A method as claimed in claim 1 in which the plies are of plain weave.

6. A method of providing an improved joint in a conveyor belt which embodies an impregnated multiple ply textile fabric core of the solid woven type wherein the plies are held together by binder threads with each ply being bounded only to its neighboring plies, which comprises weaving the core so loosely as to be unsuitable for belting duties per se, imparting stability to the core by impregnating it with an elastomeric material, separating adjacent plies at each of the belt ends to be joined by severing the binder threads, removing portions of the separated plies to expose the severed ends of the binder threads and to provide complementary mutually engageable surfaces at the belt ends, maintaining the severed binder threads in the separator plies except for those binder threads accidentally removed from the plies during separation of the plies and severing of the binder threads, applying an elastomeric material to the severed ends of the binder threads and to the complementary surfaces, engaging the complementary surfaces of the belt ends and fusing said belt ends together along with their respective binder threads to provide said joint.

7. A method as claimed in claim 1 in which the binder threads are severed by cutting.

8. A method as claimed in claim 1 in which the binder threads are severed by tearing back the plies.

9. A method of providing an improved joint in a conveyor belt which embodies an impregnated multiple ply textile fabric core of the solid woven type wherein the plies are held together by binder threads with each ply being bounded only to its neighboring plies, which comprises separating adjacent plies at each of the belt ends to be joined by cutting the binder threads, said binder threads being subjected to slight tension during cutting for stretching the binder threads to enhance their protrusion from the belt ends, removing portions of the separated plies to expose the cut ends of the binder threads and to provide complementary mutually engageable surfaces at the belt ends, maintaining the severed binder threads in the separator plies except for those binder threads accidentally removed from the plies during separation of the plies and severing of the binder threads, applying an elastomeric material to the cut ends of the binder threads and to the complementary surfaces, engaging the complementary surfaces of the belt ends and fusing said belt ends together along with their respective binder threads to provide said joint.

10. The method defined in claim 9 wherein tension is applied to the separated ply such that the binder threads are not stretched beyond one-half inch.

11. The method defined in claim 9 wherein a number of binder threads are sufficiently tensioned to displace said number of binder threads and provide pockets in the separated plies at the belt ends and wherein the elastomeric material is applied into the pockets to further enhance the strength of the joint.

References Cited

UNITED STATES PATENTS 2,800,701  7/1957  Watts et al. _____ 156—137
3,222,236  12/1965  Burrell _____ 156—159
3,224,566  12/1965  Elliott _____ 156—13

OTHER REFERENCES

Linde Air Product Co., vol. XV, No. 6, Oxy-Acetylene Tips, June 1936, page 133.

DOUGLAS J. DRUMMOND, *Primary Examiner.*